United States Patent Office 2,757,187
Patented July 31, 1956

2,757,187
POLYCARBOXYLATES

Joachim Dazzi, Dayton, Ohio, assignor to Monsanto Chemical Company, St. Louis, Mo., a corporation of Delaware No Drawing. Application November 14, 1955,
Serial No. 546,831

16 Claims. (Cl. 260—404.8)

The present invention relates to adducts and more particularly provides new polycarboxylates, methods of preparing such carboxylates by the addition reaction of certain fumarates with certain esters of higher olefinic acids, and vinyl chloride polymers plasticized with the new polycarboxylates.

According to the invention there are provided addition products having the formula:

alk—COO—Z—O—X

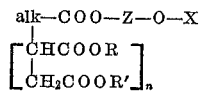

in which alk denotes a non-hydroxylated, non-conjugated, aliphatic olefinic radical of from 9 to 23 carbon atoms, Z is selected from the class consisting of alkylene radicals of from 2 to 6 carbon atoms, alkyleneoxyalkylene radicals of from 4 to 8 carbon atoms, X is selected from the class consisting of hydrogen and the radical

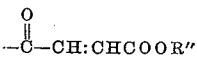

R, R' and R'' are selected from the class consisting of alkyl radicals of from 1 to 6 carbon atoms and alkoxyalkyl radicals of from 3 to 8 carbon atoms, and $n$ is an integer of from 1 to 4.

Compounds having the above formula are readily prepared by the addition reaction of a dialkyl or of a bis-(alkoxyalkyl) fumarate of from 6 to 20 carbon atoms with an ester of a non-hydroxylated, non-conjugated aliphatic olefinic monocarboxylic acid of from 10 to 24 carbon atoms and a hydroxy compound having the formula HOZOH in which Z is as defined above.

Dialkyl or bis(alkoxyalkyl) fumarates which may be condensed with the higher olefinic esters to yield the present products include, e. g., the simple dialkyl fumarates such as dimethyl, diethyl, di-n-propyl, diisobutyl, di-n-amyl, di-n-hexyl, bis(2-ethylhexyl) or di-n-octyl fumarate; the mixed dialkyl fumarates such as ethyl isopropyl fumarate, methyl n-amyl fumarate or n-butyl isohexyl fumarate; the simple bis(alkoxyalkyl) fumarates or bis(4-ethoxybutyl) fumarate and the mixed alkoxyalkyl fumarates such as 2-ethoxyethyl 3-methoxypropyl fumarate or 2-butoxyethyl n-butyl fumarate.

As examples of esters of higher mono-olefinic monocarboxylic acids which are useful for the present purpose may be mentioned hydroxyalkyl or (hydroxyalkoxy)- alkyl or hydroxy(polyalkyleneoxyalkyl) 1 - decenoates, 10-undecylenates, 1-dodecenoates, oleates, linoleates, elaidates, or erucates such as 2-hydroxyethyl 1-decenoate, 3-hydroxypropyl 10-undecylenate, 2-hydroxypropyl 1-dodecenoate, 4-hydroxybutyl oleate, 2-(2-hydroxyethoxy)- ethyl linoleate, 3-(3-hydroxypropoxy)propyl oleate, etc. The useful monocarboxylates are readily available compounds which are easily prepared in known manner, e. g., by reaction of the higher olefinic monocarboxylic acid, e. g., undecylenic acid or oleic acid or technical mixtures containing such acids with an olefin oxide such as ethylene oxide or propylene oxidee, with an alkylene glycol such as ethylene glycol or butylene glycol or with a polyalkylene glycol such as diethylene or dipropylene glycol.

Esters of technically available higher fatty acid mixtures consisting essentially of non-hydroxylated, non-conjugated aliphatic, olefinic monocarboxylic acids of from 10 to 24 carbon atoms are generally useful. Hydroxyalkyl or hydroxyalkoxyalkyl esters of tall oil unsaturated fatty acid fraction are particularly desirable. By "tall oil unsaturated fatty acid fraction" as used herein is meant the unsaturated fatty acids remaining after the rosin acids and unsaponifiables in tall oil have been substantially completely removed. Said presently useful tall oil fatty acid fraction will generally contain from 85 to 95 per cent cent by weight of unsaturated fatty acids. About half of the unsaturated fatty acid content is oleic acid and substantially the remaining half is linoleic acid. Thus a typical tall oil fatty acid fraction is characterized by its manufacturer as follows:

| | Percent |
|---|---|
| Rosin acids | 1.5 |
| Unsaponifiables | 2.7 |
| Total fatty acid | 96.98 |
| Linoleic acid | 48 |
| Linolenic acid | None |
| Oleic acid | 50 |
| Saturated acids | 2 |

The hydroalkyl or hydroalkoxyalkyl esters of only the unsaturated fatty acids portion of the tall oil fatty acid fraction undergo the present addition or addition-cross-esterification reaction with the alkyl or alkoxyalkyl fumarates. Examples of the presently useful tall oil esters are the 2-hydroxyethyl, the 3-hydroxypropyl, the 4-hydroxybutyl, the 2-(2-hydroxyethoxy)ethyl, the 3-(3-hydroxypropoxy)propyl, the 2-(2-hydroxypropoxy)propyl, the 2-(4-hydroxybutoxy)ethyl esters of tall oil unsaturated fatty acid fraction.

Reaction of the higher unsaturated acid esters with the fumarates is effected simply by heating a mixture of the two reactants at temperatures of from, say, 100° C. to 300° C., depending upon the nature of the individual reactants and of the properties desired in the final product. The reaction is generally effected at atmospheric pressure, but pressures below atmospheric or above atmospheric may be used. The reaction results not only in the addition of from 1 to 4 moles of the fumarate at the olefinic double bond of the long chained ester, but also in a cross esterification, whereby one alcoholic portion of the original fumarate is replaced by the long chained ester. Thus the reaction of a simple dialkyl fumarate such as dimethyl fumarate with a hydroxyalkyl oleate such as 2-hydroxyethyl oleate can yield products in which from 2 to 5 moles of the fumarate have reacted with the oleate, depending upon the reaction time and the proportion of reactants used. There may first occur an addition reaction in which the fumarate adds to the oleate to yield the simple addition product (I):

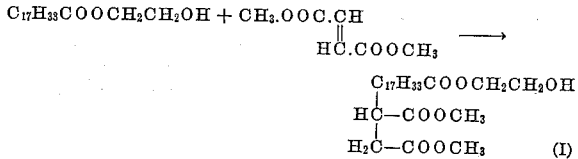

Cross esterification also takes place.

The reaction with a hydroxyalkyl ester of tall oil unsaturated fatty acids, e. g., the hydroxyethyl ester, occurs in the same way, whereby there may occur a simple addition in which the fumarate adds to the tall oil ester as follows:

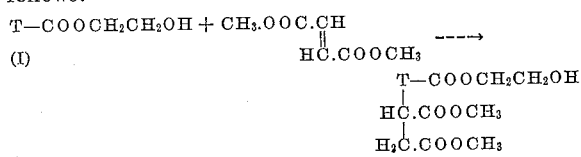

or there may occur both addition and cross-esterification to yield a product having the structure:

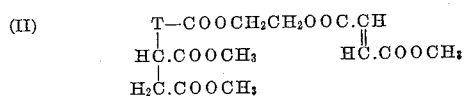

in which T is the residue of the fatty acids in the tall oil.

The proportion of products of type (I) and type (II) which are formed depends upon the nature of the initially employed fumarate and upon the reaction conditions used, longer heating time and higher temperatures giving predominantly or even exclusively products of the type (II). Reaction mixtures comprising both types of products may be resolved, if desired, by known isolating and separating procedures. However, for most purposes, e. g., for use as plasticizers, resolution of the crude mixtures is unnecessary.

Because the position at which the addition occurs cannot be determined exactly, the cross-esterified reaction product of one mole of 2-hydroxyethyl oleate or the 2-hydroxyethyl ester of tall oil fatty acids with 2 moles of dimethyl fumarate can be designated only as 2-[(1,2-dicarbomethoxyethyl)oleoyloxy]ethyl methyl fumarate or as a 2-[(1,2-dicarbomethoxyethyl)acyloxy]ethyl methyl fumarate in which the acyl radical is the residue from tall oil unsaturated fatty acids. With longer heating time and in the presence of additional dimethyl fumarate, either product (I) or (II) undergoes an addition reaction with from 1 to 3 more moles of dimethyl fumarate to yield either 2-[bis-, tris-, or tetrakis(1,2-dicarbomethoxyethyl)oleoyloxy]ethyl methyl fumarate or 2-[bis-, tris-, or tetrakis(1,2-dicarbomethoxyethyl)acyloxy]ethyl methyl fumarate in which the acyl radical is the residue of unsaturated fatty acids in tall oil (products of type (II) or analogous products of type (I)). Analogous reactions occur with hydroxyalkoxyalkyl esters of oleic or tall oil unsaturated fatty acids and the dialkyl fumarates, the cross-esterified reaction product of one mole of the 3-(3-hydroxypropoxy)propyl ester of oleic or tall oil unsaturated fatty acids with 3 moles of diethyl fumarate being 3-{3-[bis(1,2-dicarboethoxyethyl)oleoyloxy]propoxy}propyl ethyl fumarate or 3-{3-[bis(1,2-dicarboethoxyethyl)acyloxy]propoxy}propyl ethyl fumarate in which the acyl radical is derived from tall oil fatty acids. Instead of employing dialkyl fumarates, bis(alkoxyalkyl) fumarates or the mixed alkoxyalkyl alkyl fumarates may be employed to give the same type of simple or cross-esterified addition products.

The present polycarboxylates are stable, high-boiling, clear and substantially colorless viscous liquids which are advantageously employed for a variety of industrial purposes, e. g., as lubricant additives, as intermediates for the production of surface active agents, etc. They are particularly valuable as plasticizers for vinyl chloride polymers, the present esters serving not only to soften vinyl chloride polymers, but also to impart simultaneously a high degree of low temperature flexibility, very good temperature stability and great mechanical strength to these polymers. They are compatible with vinyl chloride polymers and show no exudation of plasticizer even at plasticizer content of up to 50 per cent. Although the quantity of plasticizer will depend upon the particular polymer to be plasticized and upon its molecular weight, it is generally found that compositions having from 5 per cent to 50 per cent by weight of plasticizer will, in most cases, be satisfactory for general utility.

The good flexibility of the plasticized compositions increases with increasing plasticizer concentration.

The present esters are valuable plasticizers for polyvinyl chloride and copolymers of at least 70 per cent by weight of vinyl chloride and up to 30 per cent by weight of an unsaturated monomer copolymerized therewith, for example, vinyl acetate, vinylidene chloride, etc.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from 1 to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperatures often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized compositions' usefulness as an elastomer.

*Volatility.*—Just as a decrease in temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized composition becomes stiff and hard. The test for plasticizer volatility herein employed is that described by the American Society for Testing Materials under the designation D–744–44T.

*Water resistance.*—The amount of water absorption and the amount of leaching that takes place when the plasticized composition is immersed in distilled water for 24 hours is determined.

The invention is further illustrated, but not limited, by the following examples:

*Example 1*

β-Hydroxyethyl oleate was prepared as follows: Oleic acid (715 g., 2.89 moles) and potassium hydroxide (10 g.) were charged to an autoclave, the charge was heated to 120° C. in a stream of dry nitrogen and 127 g. (2.89 moles) of ethylene oxide was introduced into the autoclave at a temperature of 125–130° C. during a period of 6.25 hours. One half of the reaction mixture was removed from the autoclave and the potassium hydroxide content of the transferred portion neutralized by treating it with 9 g. of 85% phosphoric acid and stirring the neutralized material for 2 hours at 120–130° C. in a rapid stream of dry nitrogen. The cooled reaction product was then filtered to remove inorganic material. The filtrate comprised the substantially pure β-hydroxyethyl oleate.

Reaction of the β-hydroxyethyl oleate with diethyl fumarate was effected as follows: A mixture consisting of 0.2 mole of the oleate and 1.5 moles of the fumarate was refluxed in a nitrogen atmosphere for 11 hours at a temperature of from 210–220° C. Distillation of the reaction mixture to remove material boiling at below 220° C./2–3 mm. pressure gave as residue 146.5 g. of the 1:3 hydroxyethyl oleate-diethyl fumarate reaction product, $n_D^{25}$ 1.4662, having a hydroxy number of 23.9 and comprising a mixture of 2-hydroxyethyl bis(1,2-dicarboethoxyethyl)oleate and [bis(1,2 - dicarboethoxyethyl)oleoyloxy]ethyl ethyl fumarate having the structure:

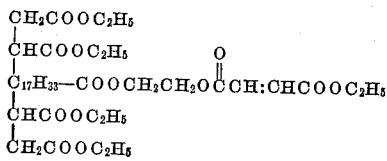

Example 2

A mixture consisting of 32.6 g. (0.1 mole) of the 2-hydroxyethyl oleate of Example 1 and 160 g. (0.7 mole) of dibutyl fumarate was heated in a nitrogen atmosphere for four and one-half hours at 245–250° F. Fractionation of the resulting mixture under reduced pressure to remove material boiling below 225° C./1 mm. gave as residue a 1:5 2-hydroxyethyl oleate-dibutyl fumarate reaction product $n_D^{25}$ 1.4640, having a hydroxy number of 19.1 and comprising a mixture of 2-hydroxyethyl tetrakis(1,2-dicarbobutoxy)oleate and 2[tetrakis(1,2-dicarbobutoxyethyl)-oleoyloxy]ethyl butyl fumarate having the formula:

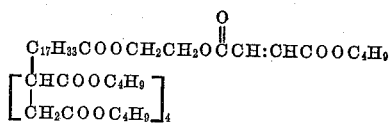

Example 3

2-(2-hydroxyethoxy)ethyl oleate was prepared as follows: Into the reaction product remaining after removal of 1 mole of 1:1 oleic acid-ethylene oxide reaction product of Example 1, there was passed 44 g. of ethylene oxide during 35 minutes at a temperature of 125–130° C. The reaction product was treated with 4.7 g. of 85% phosphoric acid in order to neutralize the potassium hydroxide, and stirred in a rapid stream of nitrogen for 1 hour at 125–135° C. Removal of the inorganic material by filtration gave as the filtrate the substantially pure 2-(2-hydroxyethoxy)-ethyl oleate.

The above oleate was reacted with bis(2-ethoxyethyl) fumarate by heating 74 g. (0.2 mole) of the oleate with 104 g. (0.4 mole) of the fumarate in a 500 ml. flask equipped with thermometer, Dean-Stark trap and condenser for about 7 hours at a temperature of 220–240° C. Fractionation of the resulting reaction mixture under reduced pressure to remove material boiling below 231° C./1.5 mm. gave as residue 154 g. of the 1:2 oleate-fumarate reaction product $n_D^{25}$ 1.4688, comprising chiefly the cross-esterified compound of the probable structure:

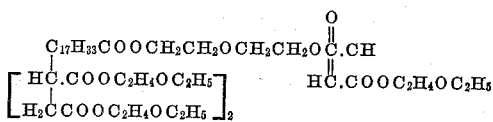

Example 4

Sixty parts of polyvinyl chloride and 40 parts by weight of the mixture of [bis(1,2-dicarboethoxyethyl)-oleoyloxy]ethyl ethyl fumarate and 2 - hydroxyethyl bis(1,2-dicarboethoxyethyl)-oleate of Example 1 were mixed on a rolling mill to a homogeneous blend. During the milling there was observed substantially no fuming and discoloration. A molded sheet of the mixture was clear, transparent, and substantially colorless. Testing of the molded sheet for low temperature flexibility, according to the testing procedure described above, gave a value of minus 19° C. which value denotes good low temperature properties. Test on the volatility characteristics of the plasticized composition gave a value of 3.2 per cent which showed good retention of plasticizer and indicated good temperature characteristics of the composition. The plasticized material had a hardness of 86. When subjected to heat at a temperature of 325° F. for a period of 30 minutes the clarity and color of the molded sheet were substantially unchanged.

Example 5

Operating as in Example 4, but employing the product of Example 3 instead of the esters employed in Example 4, there was obtained a plasticized polyvinyl chloride composition having a low temperature flexibility value of minus 25° C. Tests on the volatility characteristics of the plasticized composition gave a value of 5.4 per cent, which value shows good retention of the plasticizer. The plasticized material had a hardness of 82. When subjected to heat as in Example 4, the color of the present molded product was substantially unchanged. Tests on water-resistance of the plasticized material, employing the test procedure described above, showed a solids loss of only 0.09 per cent. The amount of leaching that takes place when the plasticized composition is immersed in kerosene at 50° C. was found to be only 0.77 per cent after 4 hours.

Example 6

The 2-hydroxyethyl ester of tall oil unsaturated fatty acids was prepared as follows:

A mixture consisting of 1450 g. (4.92 moles) of tall oil unsaturated fatty acid fraction and 29 g. of potassium hydroxide was charged to an autoclave, the charge was heated to 120° C. in a stream of dry nitrogen and 217 g. (4.92 moles) of ethylene oxide was introduced into the autoclave at a temperature of 120–125° C. during a period of 5 hours. A portion of the reaction mixture was removed from the autoclave and the potassium hydroxide content of the transferred portion neutralized by treating it with 75 per cent phosphoric acid and stirring the treated material at 120° C. in a rapid stream of dry nitrogen until all of the water appeared to have been driven off. The reaction product was then filtered to remove inorganic material. The filtrate comprised the substantially pure 2-hydroxyethyl ester of tall oil unsaturated fatty acids.

Reaction of the 2-hydroxyethyl ester with diethyl fumarate was effected as follows:

A mixture consisting of 54.5 g. (0.16 mole) of the tall oil ester and 172.0 g. (1 mole) of the fumarate was refluxed in a nitrogen atmosphere for 32 hours at a temperature of from 220–230° C. During this time 13.7 g. of a distillate was collected. Distillation of the residue to remove material boiling below 240° C./0.3 mm. gave 38.4 g. of diethyl fumarate and as residue 168.6 g. of the 1:4 reaction product of the hydroxyethyl tall oil ester and diethyl fumarate, $n_D^{25}$ 1.4780, a mixture of [(1,2-dicarboethoxyethyl)acyloxyethyl]ethyl fumarates having the structure:

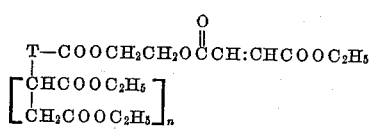

in which T is an aliphatic olefinic radical corresponding to tall oil unsaturated fatty acid fraction and $n$ is an integer of from 2 to 4. The molecular weight of the product, determined cryoscopically in benzene, was found to be 1148. A determination of the hydroxy number of the product gave a value of 4.27, which shows substantially complete cross-esterification since the calculated hydroxyl number of a corresponding addition product in which no cross-esterification has occurred is 48.8.

Example 7

Sixty parts of polyvinyl chloride and 40 parts by weight of the reaction product of Example 6 were mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of 12° C. Test on the volatility characteristics of the plasticized composition gave a value of 0.95 per cent which showed good retention of plasticizer and indicated good temperature characteristics of the composition. When subjected to heat at a temperature of 325° F. for a period of 30 minutes the clarity and color of the molded sheet were substantially unchanged.

Instead of the esters employed in the examples above, other reaction products of dialkyl or bis(alkoxyalkyl) fumarates and hydroxyalkyl or hydroxyalkoxy esters of oleic acid, linoleic acid, undecylenic acid, dodecenoic acid or of tall oil unsaturated fatty acid fraction may be employed to yield similarly valuable plasticized products.

While the above examples show only compositions in which the ratio of plasticizer to polymer content is 40:60, this ratio being employed in order to get comparable efficiencies, the content of ester to polyvinyl chloride may be widely varied, depending upon the properties desired in the final product. For many purposes a plasticizer content of, say, from only 10 per cent to 20 per cent is preferred. The present esters are compatible with polyvinyl chloride over wide ranges of concentrations, up to 50 per cent of esters based on the total weight of the plasticized composition yielding desirable products.

Although the invention has been described particularly with reference to the use of the present esters as plasticizers for polyvinyl chloride, these esters are advantageously employed also as plasticizers for copolymers of vinyl chloride, for example, the copolymers of vinyl chloride with vinyl acetate or vinylidene chloride, etc. Preferably, such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; however, for many purposes it may be advantageous to use known stabilizers in the plasticized compositions. Inasmuch as the present esters are substantially unreactive with the commercially available heat and light stabilizers which are commonly employed with polyvinyl chloride or copolymers thereof, the presence of such materials in the plasticized compositions does not impair the valuable properties of the present esters. The present esters are of general utility in softening vinyl chloride polymers. They may be used as the only plasticizing component in a compounded vinyl chloride polymer or they may be used in conjunction with other plasticizers.

This is a continuation-in-part of my copending applications Serial Nos. 268,328, filed January 25, 1952 and 268,329, filed January 25, 1952.

What I claim is:

1. An addition product having the formula:

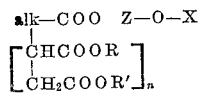

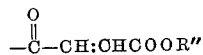

in which alk denotes a non-hydroxylated, non-conjugated, aliphatic olefinic radical of from 9 to 23 carbon atoms, Z is selected from the class consisting of alkylene radicals of from 2 to 6 carbon atoms, alkyleneoxyalkylene radicals of from 4 to 8 carbon atoms, X is selected from the class consisting of hydrogen and the radical $$-\overset{O}{\underset{\|}{C}}-CH{:}CHCOOR''$$

R, R' and R'' are selected from the class consisting of alkyl radicals of from 1 to 6 carbon atoms and alkoxyalkyl radicals of from 3 to 8 carbon atoms, and $n$ is an integer of from 1 to 4.

2. 2-[(1,2-dicarboalkoxyethyl)acyloxy]ethyl alkyl fumarates in which each alkyl radical has from 1 to 6 carbon atoms, each carboalkoxy radical has from 2 to 7 carbon atoms and in which the acyl radical is a residue of the unsaturated fatty acids in tall oil.

3. 2 - [bis(1,2 - dicarboalkoxyethyl)acyloxy]ethyl alkyl fumarates in which each alkyl radical has from 1 to 6 carbon atoms, each carboalkoxy radical has from 2 to 7 carbon atoms and in which the acyloxy radical is non-hydroxylated mono-olefinic and aliphatic and has from 10 to 24 carbon atoms.

4. 2 - [tris(1,2-dicarboalkoxyethyl)acyloxy]ethyl alkyl fumarates in which each alkyl radical has from 1 to 6 carbon atoms, each carboalkoxy radical has from 2 to 7 carbon atoms and in which the acyloxy radical is non-hydroxylated mono-olefinic and aliphatic and has from 10 to 24 carbon atoms.

5. 2-[tetrakis(1,2-dicarboalkoxyethyl)acyloxy]ethyl alkyl fumarates in which each alkyl radical has from 1 to 6 carbon atoms, each carboalkoxy radical has from 2 to 7 carbon atoms and in which the acyloxy radical is non-hydroxylated mono-olefinic and aliphatic and has from 10 to 24 carbon atoms.

6. 2-[bis(1,2-dicarboethoxyethyl)oleoyloxy]ethyl ethyl fumarate.

7. 2-[tetrakis(1,2 - dicarbobutoxyethyl)oleoyloxy]ethyl butyl fumarate.

8. A mixture of 2-[(1,2-dicarboethoxyethyl)acyloxy]-ethyl ethyl fumarates of the formula

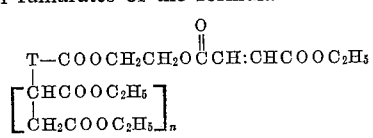

in which T is a residue of the unsaturated fatty acids in tall oil and $n$ is an integer of from 2 to 4.

9. The method which comprises heating at a temperature of 100° C. to 300° C., a fumarate having the formula

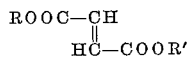

in which R and R' are selected from the class consisting of alkyl radicals of from 1 to 6 carbon atoms and alkoxyalkyl radicals of from 3 to 6 carbon atoms with an ester of a non-hydroxylated, non-conjugated, olefinic fatty acid of from 10 to 24 carbon atoms and a hydroxy compound having the formula: HOZOH in which Z is selected from the class consisting of alkylene radicals of from 2 to 6 carbon atoms, and alkyleneoxyalkylene radicals of from 4 to 8 carbon atoms, and recovering from the resulting reaction product polycarboxylates having the formula:

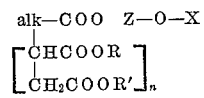

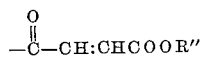

in which alk denotes a non-hydroxylated, non-conjugated, aliphatic olefinic radical of from 9 to 23 carbon atoms, Z is selected from the class consisting of alkylene radicals of from 2 to 6 carbon atoms, alkyleneoxyalkylene radicals of from 4 to 8 carbon atoms, X is selected from the class consisting of hydrogen and the radical $$-\overset{O}{\underset{\|}{C}}-CH{:}CHCOOR''$$

R, R' and R'' are selected from the class consisting of alkyl radicals of from 1 to 6 carbon atoms and alkoxyalkyl radicals of from 3 to 8 carbon atoms, and $n$ is an integer of from 1 to 4.

10. The method which comprises heating a dialkyl fumarate in which each alkyl radical has from 1 to 6 carbon atoms with a hydroxyethyl ester of tall oil fatty acids and recovering from the resulting reaction product 2-[1,2-dicarboalkoxyethyl]-acyloxy]ethyl alkyl fumarates in which each alkyl radical has from 1 to 6 carbon atoms, each carboalkoxy radical has from 2 to 7 carbon atoms and in which the acyl radical is a residue of tall oil fatty acids.

11. The method which comprises heating at a temperature of 100° C. to 300° C. a dialkyl fumarate in which each alkyl radical has from 1 to 6 carbon atoms with a hydroxyalkyl ester of a non-hydroxylated, non-conjugated olefinic fatty acid having a total of from 13 to 30 carbon atoms and recovering from the resulting reaction product 2-[bis(1,2-dicarboalkoxyethyl)acyloxy]-ethyl alkyl fumarates in which each alkyl radical has from 1 to 6 carbon atoms, each carboalkoxy radical has from 2 to 7 carbon atoms and in which the acyloxy radical is mono-olefinic and aliphatic and has from 10 to 24 carbon atoms.

12. The method which comprises heating at a temperature of 100° C. to 300° C. a dialkyl fumarate in which each alkyl radical has from 1 to 6 carbon atoms with a hydroxy alkyl ester of a non-hydroxylated, non-conjugated olefinic fatty acid having a total of from 13 to 30 carbon atoms and recovering from the resulting reaction product 2-[tris(1,2-dicarboalkoxyethyl)acyloxy]-ethyl alkyl fumarates in which each alkyl radical has from 1 to 6 carbon atoms, each carboalkoxy radical has from 2 to 7 carbon atoms and in which the acyloxy radical is mono-olefinic and aliphatic and has from 10 to 24 carbon atoms.

13. The method which comprises heating at a temperature of 100° C. to 300° C. a dialkyl fumarate in which each alkyl radical has from 1 to 6 carbon atoms with a hydroxy alkyl ester of a non-hydroxylated, non-conjugated olefinic fatty acid having a total of from 13 to 30 carbon atoms and recovering from the resulting reaction product 2-[tetrakis(1,2-dicarboalkoxyethyl)acyloxy]ethyl alkyl fumarates in which each alkyl radical has from 1 to 6 carbon atoms, each carboalkoxy radical has from 2 to 7 carbon atoms and in which the acyloxy radical is mono-olefinic and aliphatic and has from 10 to 24 carbon atoms.

14. The method which comprises heating at a temperature of 100° C. to 300° C. β-hydroxyethyl oleate with diethyl fumarate and recovering 2-[(1,2-dicarboethoxyethyl)oleoyloxy]ethyl ethyl fumarate from the resulting reaction product.

15. The method which comprises heating at a temperature of 100° C. to 300° C. 2-hydroxyethyl oleate with dibutyl fumarate and recovering 2-[tetrakis(1,2-dicarbobutoxyethyl)oleoyloxy]-ethyl butyl fumarate from the resulting reaction product.

16. The method which comprises heating the 2-hydroxyethyl ester of tall oil unsaturated fatty acid fraction with diethyl fumarate and recovering from the resulting reaction product a mixture of 2-[(1,2-dicarboethoxyethyl)acyloxy]ethyl ethyl fumarates of the formula

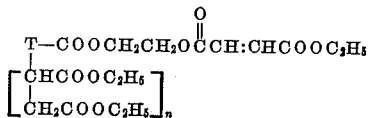

in which T is a residue of the unsaturated fatty acids in tall oil and $n$ is an integer of from 2 to 4.

References Cited in the file of this patent
UNITED STATES PATENTS

| | | |
|---|---|---|
| 2,121,294 | Humphrey | June 21, 1938 |
| 2,188,882 | Clocker | Jan. 30, 1940 |
| 2,251,070 | Schantz | July 29, 1941 |
| 2,353,927 | Pickett | July 18, 1944 |
| 2,365,300 | Segessemann | Dec. 19, 1944 |
| 2,422,177 | Blair | June 17, 1947 |
| 2,443,284 | Waldie | June 15, 1948 |
| 2,444,328 | Blair | June 29, 1948 |
| 2,467,912 | Rust | Apr. 19, 1949 |
| 2,534,743 | Vincent | Dec. 19, 1950 |
| 2,563,312 | Dazzi | Aug. 7, 1951 |
| 2,568,747 | Kirkpatrick et al. | Sept. 25, 1951 |
| 2,572,035 | Jordon et al. | Oct. 23, 1951 |
| 2,598,636 | Dazzi | May 27, 1952 |
| 2,683,701 | Dazzi | July 13, 1954 |
| 2,687,421 | Butler | Aug. 24, 1954 |

FOREIGN PATENTS

| | | |
|---|---|---|
| 642,414 | Great Britain | Sept. 6, 1950 |